(12) United States Patent
Barnes (10) Patent No.: US 8,971,928 B2
(45) Date of Patent: Mar. 3, 2015

(54) METHOD AND SYSTEM FOR CHANGING GEOGRAPHIC INFORMATION DISPLAYED ON A MOBILE DEVICE

(75) Inventor: Craig Barnes, Forest Park, IL (US)

(73) Assignee: HERE Global B.V., Veldhoven (NL)

( * ) Notice: Subject to any disclaimer, the term of this patent is extended or adjusted under 35 U.S.C. 154(b) by 10 days.

(21) Appl. No.: 13/443,612

(22) Filed: Apr. 10, 2012

(65) Prior Publication Data
US 2013/0267248 A1 Oct. 10, 2013

(51) Int. Cl.
*H04W 24/00* (2009.01)
*H04M 1/00* (2006.01)

(52) U.S. Cl.
USPC ........................................ 455/456.3; 455/566

(58) Field of Classification Search
USPC ............ 455/456.1–457, 566, 456.3; 701/431, 701/432, 438, 439, 487, 410, 426, 428, 433, 701/491, 532, 533; 715/863; 345/156, 158
See application file for complete search history.

(56) References Cited

U.S. PATENT DOCUMENTS

| | | | |
|---|---|---|---|
| 5,731,979 A | 3/1998 | Yano et al. | |
| 7,023,456 B2 | 4/2006 | Huber et al. | |
| 7,949,464 B2 | 5/2011 | Kaplan et al. | |
| 2004/0107220 A1* | 6/2004 | Natesan et al. | 707/104.1 |
| 2008/0243367 A1 | 10/2008 | Wako | |
| 2008/0320419 A1* | 12/2008 | Matas et al. | 715/863 |
| 2009/0322671 A1* | 12/2009 | Scott et al. | 345/156 |
| 2010/0125816 A1* | 5/2010 | Bezos | 715/863 |
| 2010/0136957 A1* | 6/2010 | Horodezky et al. | 455/414.2 |
| 2010/0228612 A1 | 9/2010 | Khosravy et al. | |
| 2010/0333045 A1* | 12/2010 | Gueziec et al. | 715/863 |
| 2011/0141141 A1* | 6/2011 | Kankainen | 345/632 |
| 2013/0016102 A1* | 1/2013 | Look et al. | 345/426 |
| 2013/0093667 A1* | 4/2013 | McCallum | 345/156 |

FOREIGN PATENT DOCUMENTS

EP 1 074 959 5/2006

OTHER PUBLICATIONS

International Search Report and Written Opinion for PCT Application No. PCT/EP2013/056383, mailed Jul. 1, 2013.

* cited by examiner

*Primary Examiner* — Daniel Lai
(74) *Attorney, Agent, or Firm* — Lempia Summerfield Katz LLC (57) ABSTRACT

Convenient control of navigation or mapping image content on a mobile device is provided. Map and/or navigation information is displayed. Movement of the mobile device or a user associated with the mobile device is detected. The content of the display is changed as a function of the detected movement.

17 Claims, 7 Drawing Sheets

METHOD AND SYSTEM FOR CHANGING GEOGRAPHIC INFORMATION DISPLAYED ON A MOBILE DEVICE

BACKGROUND

The present embodiments relate to a method and a system for changing geographic information displayed on a mobile device.

Mobile or portable devices, such as mobile telephones, portable personal computers (e.g., notebook computers, tablets), personal digital assistants (PDAs), and/or personal navigation systems, may be used to obtain and/or provide various geographic information, features, and services. Mobile and portable devices may, for example, provide a user traveling through a geographic region with a map of the geographic region. The map may detail a road network, geo-political boundaries, topographical features (e.g., lakes, mountains, etc.), and/or points of interest in the geographic region. Example points of interest include businesses (e.g., retailers, merchants, service providers, other businesses, etc.), tourist attractions (e.g., museums, sporting venues), and/or municipal entities (e.g., City Hall). Mobile and portable devices may also provide information (e.g., hours of operation, address, phone number, etc.) about the road network, geo-political boundaries, geological features, and/or points of interest, either directly on the map or on a separate screen.

These mobile and portable devices may also provide the user with route calculation and guidance. For example, some mobile or portable computing platforms are able to provide users with an optimum route to travel using roads in the road network between locations in the geographic region. Using input from an end user, and, optionally, from equipment, such as a GPS system, that may determine the end user's physical location, a navigation application program determines a route to travel from a starting location to a destination location in the geographic region. The user of the mobile or portable computing platform is then provided with information about the route in the form of instructions that identify the maneuvers to travel from the starting location to the destination location.

Although present mobile or portable devices that provide geographic information, features, and/or services are able to provide many useful advantages, there continues to be room for improvement. Currently, end users who are viewing one screen or display of geographic information (e.g., maps, route guidance, etc.) and wish to view or see different or additional geographic information must view that information in a different or separate screen or display on their mobile or portable device and/or actively import that information via their mobile or portable device by, for example, downloading that information or selecting that information using a series of menus. Thus, it is an objective of the present embodiments to provide a quicker, easier, and more intuitive way for end users to change or switch between and/or view different and/or additional screens or displays of geographic information via their mobile or portable device.

SUMMARY

To address these and other objectives, the present embodiments relate to quickly, easily, and intuitively changing geographic information displayed or provided on a mobile device.

In one embodiment, a method is provided that includes obtaining first and second geographic information associated with a geographic region and providing, by a processor, the obtained first geographic information on a display of a mobile device. The method also includes detecting a movement of the mobile device or a user associated with the mobile device. The method further includes changing, by the processor, the display of the mobile device to display the second geographic information, the second geographic information being different than the first geographic information. The changing is a function of the detected movement.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

Figure 1:
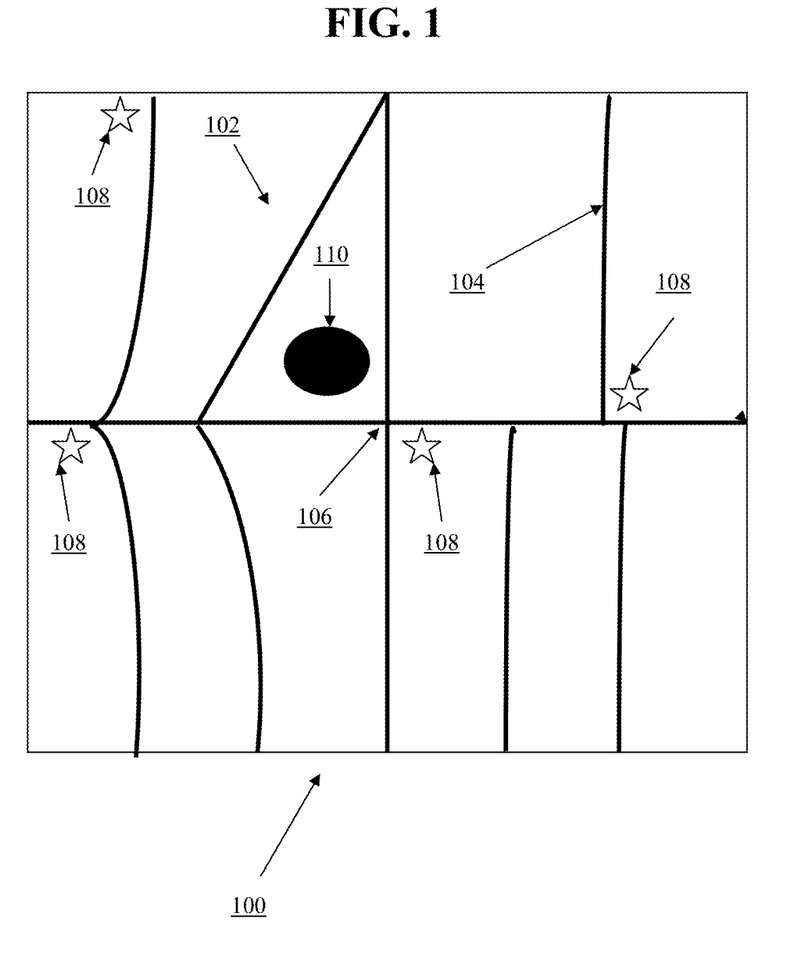
FIG. 1 depicts a map of an exemplary geographic region.

FIG. 1 is diagram illustrating a geographic region 100. The region 100 may be a country (e.g., France), state (e.g., Illinois), province, city (e.g., Chicago), metropolitan area (e.g., the New York metropolitan area), county (e.g., Cook County, Ill.), any other municipal entity, or any other area of comparable or different size. Alternatively, the geographic region 100 may be a combination of one or more countries, states, cities, metropolitan areas, and so on. The region 100 may also represent locations without reference to geo-political boundaries, such as being a rectangular regions centered on or relative to a particular point or location. The region 100 includes a road network 102. The road network 102 may include, among other things, a plurality of road segments 104 connected at intersections 106 throughout the region 100. The region 100 may also include one or more points of interest 108, such as businesses, municipal entities, tourist attractions, and/or other points of interest not explicitly described herein. The region 100 further includes one or more topographical features 110 (e.g., ponds, lakes, mountains, hills, etc.) of the geographic region 100.

Additional, different, or fewer items may be included in the region 100. For example, the road network 102, the road segments 104, the intersections 106, the points of interest 108, and/or the topographical features 110 are not provided. Though not depicted herein, the region 100 may also include a pedestrian network having sidewalks and pedestrian paths, a bicycle network having bike paths, bike lanes on road segments, and/or road segments appropriate for bicycle travel, and/or a public transit network including, for example, railroads, public bus lines, tourist bus lines, metro railway lines (e.g., subways and elevated lines), light rail (e.g., trams, trolleys, or street cars), water taxi, and stations and/or stops for one or more of each. The region 100 may include other networks, features, and/or points as well.

Figure 2:
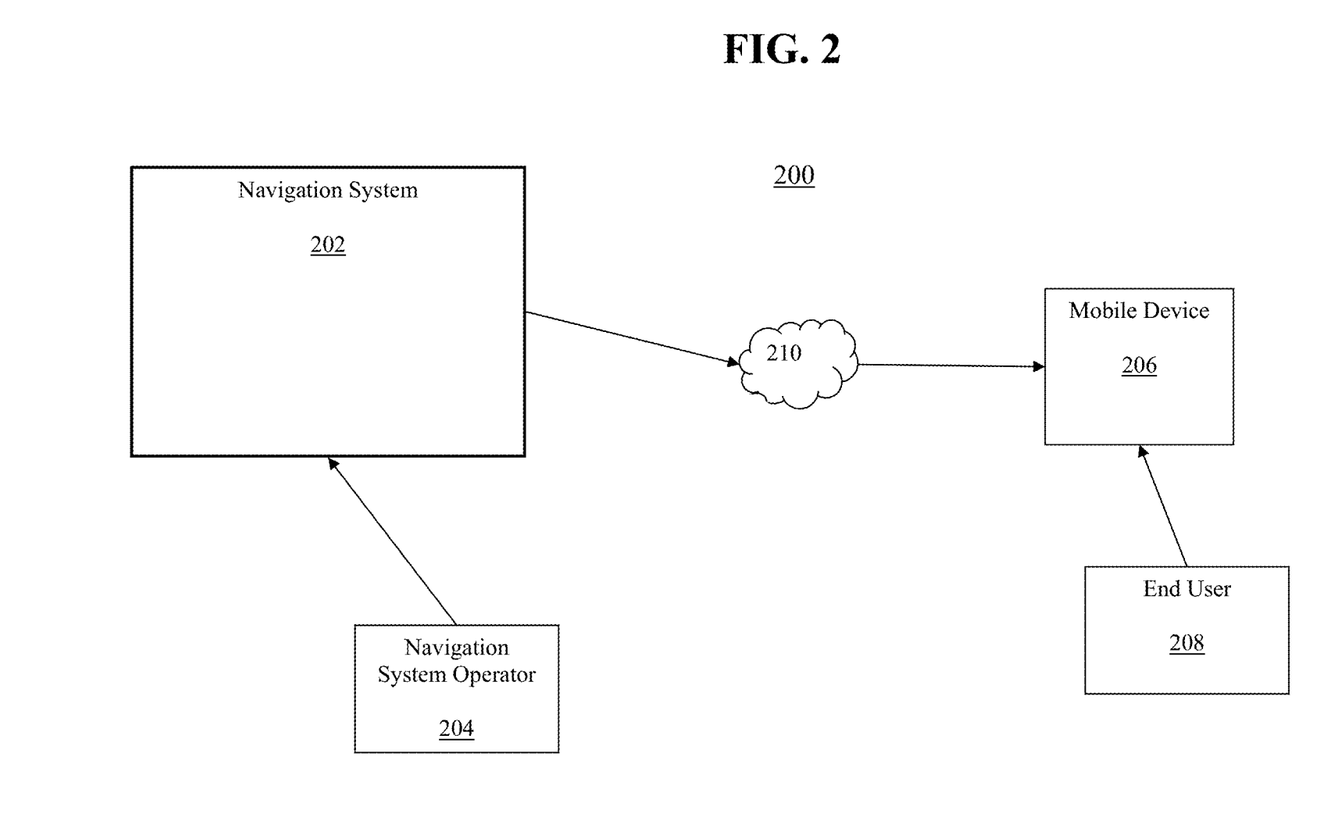
FIG. 2 depicts a block diagram of one embodiment of a system for changing geographic information displayed on a mobile device.

FIG. 2 shows a block diagram of one embodiment of a system 200 for changing, altering, or switching geographic information displayed or provided on a mobile device. The system 200 generally includes a navigation system 202 operated by, or otherwise associated with, a system operator 204 (e.g., NAVTEQ or Nokia Corp.), and a mobile device 206 owned or operated by an end user 208. In this embodiment, the navigation system 202 is coupled with or connected to the mobile device 206 via a wired or wireless communication network 210. As used herein, the phrases "in communication" and "couple" are defined to mean directly connected to or indirectly connected through one or more intermediate components. Such intermediate components may include hardware and/or software based components. Additional, different, or fewer components may be provided. For example, additional mobile devices 206 and/or networks 210 may be provided. In other embodiments, the navigation system 202, and components thereof, may be partially or fully located within or be part of the mobile device 206. For example, the mobile device 206 may contain the navigation system 202. In other embodiments, the navigation system 202 (or individual components thereof, as described below) may be implemented as computer program logic or computer readable program code stored in the memory and/or storage of a computer, such as the computer 600 described below with respect to FIG. 7, and executable by one or more processors thereof to implement the disclosed functionality.

The network 210 may be a wireless network or a combination of a wired and wireless network, such as a cellular telephone network and/or 802.11x compliant network, and may include a publicly accessible network, such as the Internet, a private network, or combination thereof. The type and configuration of the communications network 210 is implementation dependent, and any type of communications network which facilitates the described communications between the navigation system 202 and the mobile device 206, available now or later developed, may be used.

Figure 3:
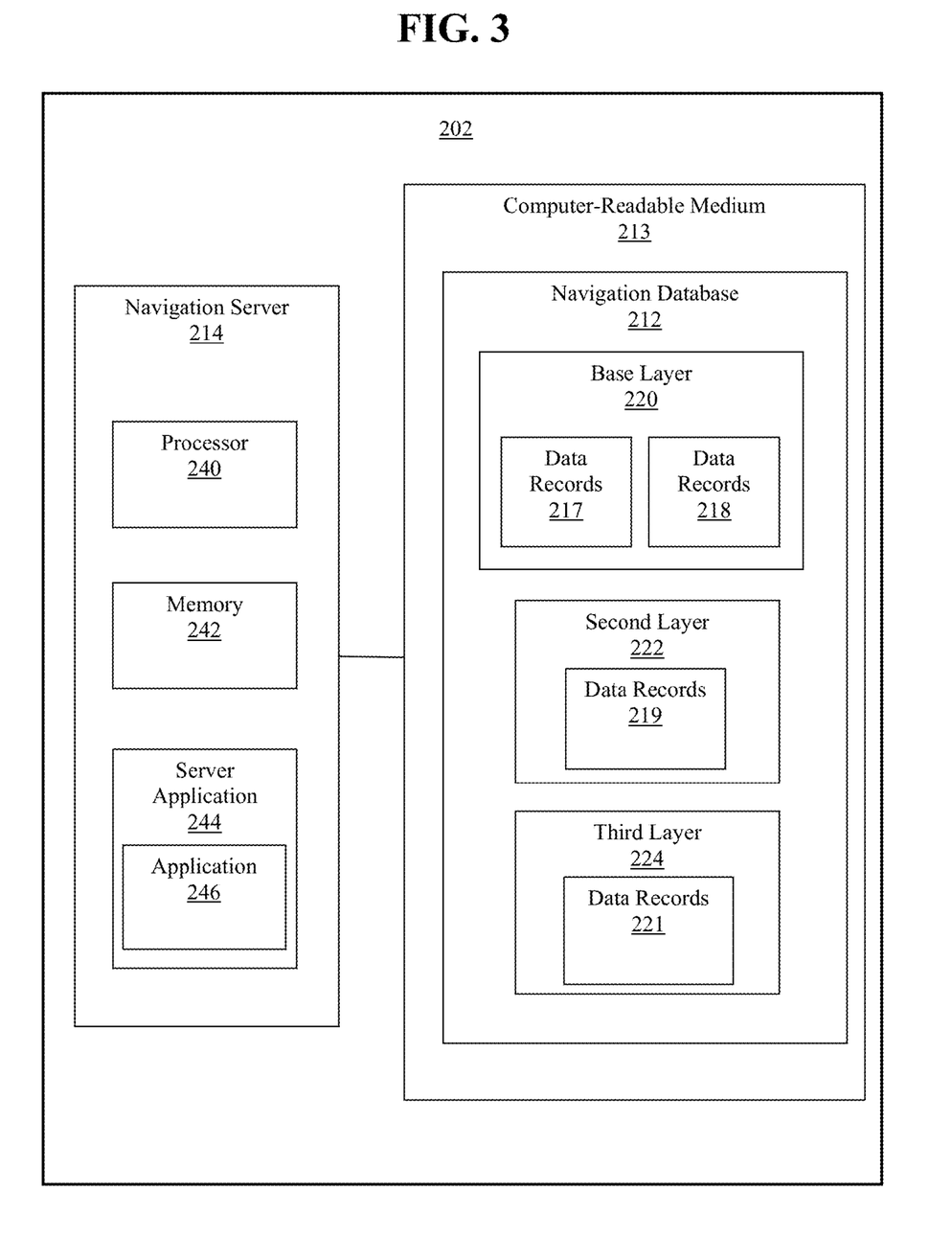
FIG. 3 depicts a block diagram of a navigation system of the system of FIG. 2, according to one embodiment.

FIG. 3 shows a block diagram of the navigation system 202 in greater detail. The system 202 includes a navigation database 212 stored on a computer readable medium 213. The computer readable medium 213 may include one or more hard drives or other storage medium. The system 202 further includes a navigation server 214 that may access the computer readable medium 213. In other embodiments, the server 214 may be part of or separate (e.g., remote) from the database 212.

The navigation database 212 stores or maintains geographic data, such as, for example, road segment or link data records 217, node data records 218, point of interest data records 219, and topographical data records 221. The link data records 217 are links or segments representing the roads, streets, or paths 104. The node data records 218 are end points (e.g., the intersections 106) corresponding to the respective links or segments of the road segment data records 217. The road data link records 217 and the node data records 218 may represent, for example, the road network 102 or other road networks used by vehicles, cars, and/or other entities. The road link data records 217 may be associated with attributes of or about the roads 104, such as geographic coordinates, street names, address ranges, speed limits, turn restrictions at intersections, and other navigation related attributes (e.g., one or more of the road segments 104 is part of a highway or tollway, the location of stop signs and/or stoplights along the road segments 104, etc.), as well as POIs, such as gasoline stations, hotels, restaurants, museums, stadiums, offices, automobile dealerships, auto repair shops, buildings, stores, parks, etc.

The node data records 218 may likewise be associated with attributes (e.g., about the intersections 106), such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The point of interest data records 219 may be associated with attributes of or about one or more of the points of interest 108, such as an address, a phone number, hours of operation, and/or a classification (e.g., restaurant, hotel, coffee shop, museum, etc.) of or for the point of interest 108. The topographical data records 221 may be associated with attributes of or about the topographical features 110 (e.g., lakes, ponds, rivers, mountains, etc.), such as geographic coordinates, names, size (height/depth/width), temperature, etc. The geographic data may also include other data records, such as, for example, cartographic data records, routing data, and maneuver data. Additional, fewer, or different data records may be provided.

The navigation database 212, and, more particularly, the geographic data, may be organized or divided into one or more layers. As shown in FIG. 3, the database 212 in this embodiment is organized into three layers—a base layer 220, a second layer 222, and a third layer 224 stored on the computer readable medium 213. The layers 220, 222, 224 in this embodiment contain one or more data records 217, 218, 219, 221, but may, alternatively or in addition to, contain one or more other data records and/or other geographic data. In one embodiment, the navigation database 212 may be organized or divided into two layers—the base layer 220 and the second layer 222. In other embodiments, the navigation database 212 may be organized or divided into more than three layers or without layers.

As shown in FIG. 3, the base layer 220 includes the road link data records 217 and the node data records 218. The second layer 222 includes the point of interest (POI) data records 219. The third layer 224 includes the topographical data records 221. In other embodiments, the base, second, and/or third layers 220, 222, 224, may include more, less, or different data records and/or geographic data about the geographic region 100. For example, the base layer 220 may include the topographical data records 221, the second layer 222 may include the POI data records 219, and the third layer 224 may include the road data records 217 and the node data records 218. Likewise, the base layer 220 may include the road data records 217 and the node data records 218, the POI data records 219, and the topographical data records 221, while the second and third layers 222, 224 include other data records of the geographical data. The end user 208 may also customize which data records are organized into the layers 220, 222, 224. Other combinations of data records 217, 218, 219, 221, or other data records, and the layers 220, 222, 224, or other layers, are possible as well.

The organization and/or placement of the data records 217, 218, 219, 221 into the layers may be performed by the system operator 204 and/or the end user 208. The organization and/or placement may be based on, for example, the importance, usefulness, and/or detail of the layers 220, 222, 224 and/or the data records 217, 218, 219, 221. The organization and placement may also be based on the preferences of the end user 208. For example, the system operator 204 may determine that the data from the topographical data records 221 is or would be most important or useful to the end user 208.

Accordingly, the operator 204 may assign the topographical data records 221 to the base layer 220.

The navigation server 214 includes a processor 240, a memory 242, and a server application 244. The server application 244 may be stored on one or more hard drive(s), cache, RAM, or other computer-readable media operated by the server 214 and loaded into the memory 242 of the server 214 to be executed by the processor 240. In other embodiments, additional, different, or fewer components may be used for the navigation server 214.

The server application 244 includes a navigation-related server application 246. The navigation-related server application 246 obtains or accesses the geographic data, particularly the data records 217, 218, 219, and 221, stored or maintained in the navigation database 212. In turn, the server application 246 may provide different geographic information, content, services, features, and/or functions to the end user 208 of the mobile device 206. The navigation-related server application 246 may, for example, generate or provide one or more maps for the end user 208, such as a map 248 (see FIG. 5A) depicting the base layer 220 of the geographic data (i.e., the road link data records 217 and the node data records 218), a map depicting the second layer 222 of the geographic data (i.e., the POI data records 219), a map depicting the third layer 224 of the geographic data (i.e., the topographical data records 221), and/or other maps depicting these or other layers and/or these or other data records of the geographic data. The navigation-related server application 246 may, alternatively or in addition thereto, provide or generate route calculation and/or route guidance for the end user 208, and/or provide other navigation-related or map-related information (e.g., position identification). The navigation-related server application 246 may be written in a suitable computer programming language such as C, although other programming languages, such as C++ or Java, are also suitable.

Figure 4:
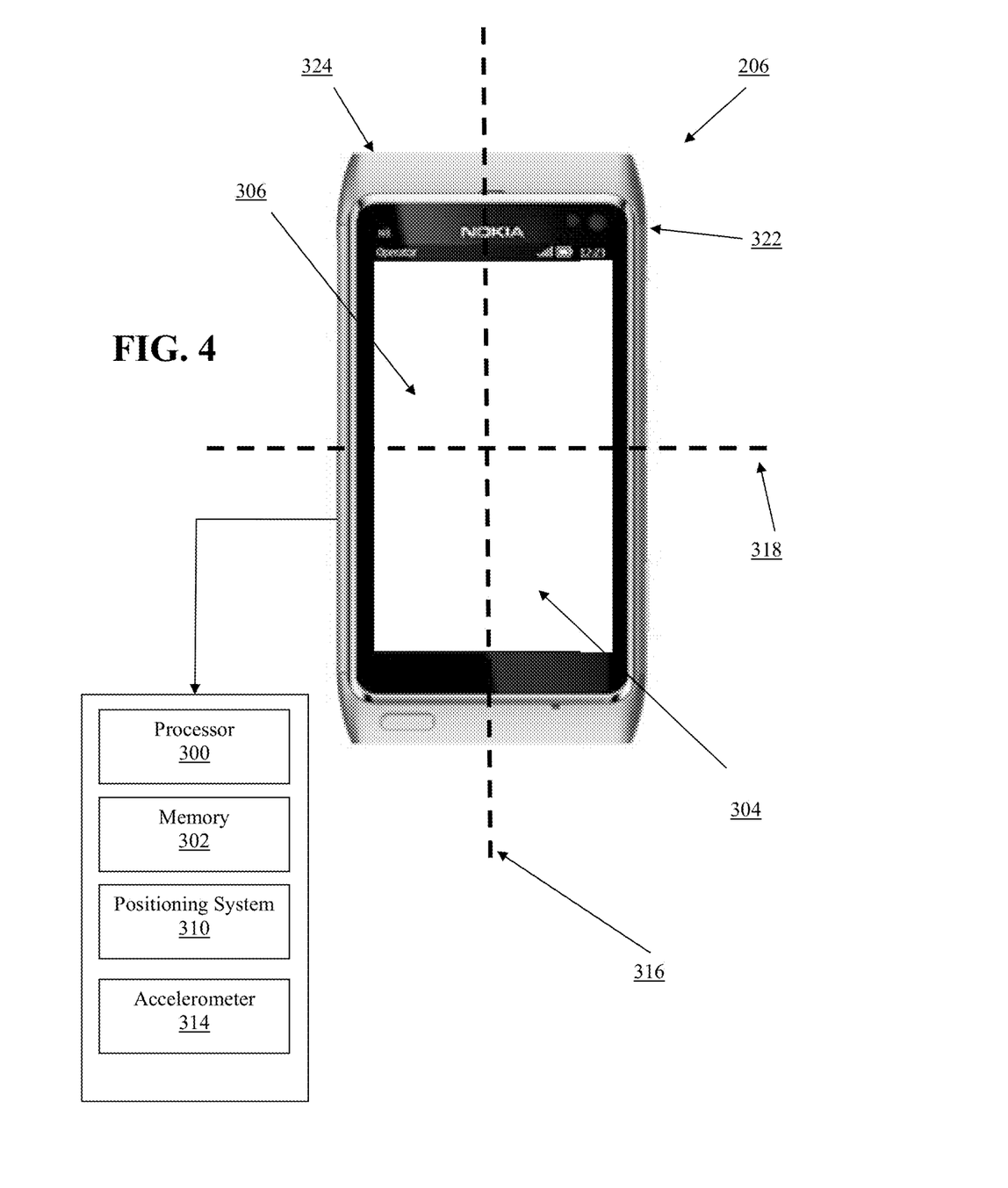
FIG. 4 depicts a more detailed view of the example mobile device of FIG. 2.

FIG. 4 shows a more detailed view of the mobile device 206 in greater detail. The mobile device 206 is a smart phone (e.g., manufactured by Nokia Corp.). In other embodiments, the mobile device 206 may be a mobile phone, a personal digital assistant ("PDA"), a tablet computer, a notebook computer, a personal navigation device ("PND"), a portable navigation device, and/or any other portable or mobile device associated with the end user 208. In this embodiment, the mobile device 206 includes a processor 300, a memory 302, an input device 304, and a display 306. As mentioned above, in other embodiments, the mobile device 206 may also include the system 202, or components of the system 202 (e.g., the navigation server 214, database 212, or portions thereof).

The processor 300 may be any type of processor suitable for mobile devices and/or computers. The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may include an optical, magnetic (hard drive) or any other form of data storage device. The memory 302 may be removable from the mobile device 206 (e.g., may be a secure digital (SD) memory card).

The input device 304 may be one or more buttons, keypad, keyboard, mouse, stylist pen, trackball, rocker switch, touch pad, voice recognition circuit, touch screen, or other device or component for inputting data to the mobile device 206. The end user 208 may, for example, request geographic information, such as one or more maps of the geographic data (e.g., the map 248) and/or navigational information (e.g., route guidance, route calculation, a location of the mobile device 206, etc.), from the navigation-related server application 246 via or using the input device 304. The display 306 may be a liquid crystal display (LCD) panel, light emitting diode (LED) screen, thin film transistor screen, or another type of display. The display 306 is operable to display or present geographic information (e.g., one or more of the maps of the geographic data, route guidance, route calculation, the location of the mobile device 206, etc.) obtained or received from the navigation-related server application 246. As shown in FIG. 4, in this embodiment, the mobile device 206 has a touch screen, which may be capacitive, resistive, surface acoustic wave, or another type, such that the input device 304 and the display 306 are the same.

The mobile device 206 further includes a positioning system 310. The positioning system 310 includes a global positioning system (GPS) or a cellular or similar position sensor for providing location data. The positioning system 310 may utilize GPS-type technology, a dead reckoning-type system, cellular location, or combinations of these or other systems. The positioning system 310 may include suitable sensing devices that measure the traveling distance, speed, direction, and so on, of the device 206. The positioning system 310 may also include a receiver and correlation chip to obtain a GPS signal.

The mobile device 206 further includes one or more detectors or sensors located or positioned anywhere within, outside of, or a combination thereof, of the mobile device 206. The one or more detectors or sensors are generally operable to detect, recognize, or measure translational and/or rotational movement of the mobile device 206. The detected or measured rotational and/or translational movement may be movement due to changing an orientation of the mobile device 206. The measured rotational and/or translational is different than movement associated with a change in a geographic location of the mobile device 206 (i.e., movement other or different than movement of the mobile device 206 due to or caused by traveling along the roads 104, bike network, transit network, other network, and/or other path or route). The one or more detectors or sensors are, alternatively or additionally, generally operable to detect, recognize, or measure translational and/or rotational movement of a portion or a body part, such as an arm, head, shoulder, finger, etc., of the end user 208 associated with the mobile device 206. This may include, for example, changing the orientation or the position of the end user 208 relative to the mobile device 206. The one or more detectors or sensors may include an optical sensor or detector, such as a camera, a motion sensor or detector, such as a tilt sensor, gyroscope, or an accelerometer, a touch or tactile sensor, such as an infrared, acoustic, or capacitive sensor, any other known or later developed sensor or detector, or a combination thereof.

In one embodiment, the one or more detectors or sensors include an accelerometer 314 built or embedded into or within the interior of the mobile device 206. The accelerometer 314 is operable to detect, recognize, or measure rotational movement of the mobile device 206 by the end user 208 or other source. When the accelerometer 314 determines or detects that the mobile device 206 has been rotated about its vertical axis 316 and/or horizontal axis 318 (see FIG. 4), the accelerometer 314 measures or determines the magnitude of the rotation of the device 206 about the vertical axis 316, the horizontal axis 318, and/or another axis. The accelerometer 314, for example, may determine that the device 206 has been rotated at an angle of 30 degrees, 45 degrees, etc., about the vertical axis 316 of the mobile device 206. Alternatively, the accelerometer 314 measures that rotation has occurred and/or measures a direction with or without determination of a specific magnitude (e.g., binary decision of threshold magnitude). The accelerometer 314 outputs or transmits, to the processor 300, data indicative of the measured or determined rotational information of the mobile device.

Alternatively, or in addition to, the one or more detectors or sensors include a camera 322 located on or built into a top right-hand corner of the front surface or face 324 of the mobile device 206 (defined, at least in this embodiment, as the surface or face of the device 206 facing the end user 208). In other embodiments, the camera 322 may be positioned or located elsewhere on the mobile device 206. For example, the camera 322 may be located on or built into a rear surface (not shown) of the mobile device. The camera 322 is operable to detect, recognize, or measure movement of the end user 208. The camera 322 may detect, recognize, or measure movement or a change in orientation or position of the end user 208 relative to the mobile device 206 (and, particularly, the camera 322). The camera 322 may, for example, detect, recognize, or measure side-to-side, up-to-down (or vice-versa), rotational, and/or other movement of the end user's arm(s), finger(s), hand(s), shoulder(s), head, and/or other body parts relative to the mobile device 206. In one embodiment, the camera 322 is operable to detect, recognize, measure, or track side-to-side movement of the end user's head relative to the mobile device 206. The mobile device 206 may be moved at the same time (though to a lesser extent) or may be stationary. The camera 322 outputs or transmits, to the processor 300, data indicative of the measured or determined movement (e.g., direction, magnitude, absolute angle, or other characteristic) of the end user 208 to the processor 300.

With reference again to FIG. 2, the mobile device 206 is generally operable to obtain, access, or request and receive the geographic information (e.g., the map 248, one or more other maps of the geographic data, route guidance, route calculation, other navigational information, or combinations thereof) from the navigation-related server application 246 over or via the network 210. The server application 246 may transmit, provide, or send the geographic information to the mobile device 206 in response to a request for the geographic information submitted or entered by the end user 208 via the input device 304. For example, the end user 208 may request the map 248 of the base layer 220 from the server application 246. Alternatively, the server application 246 may automatically send, transmit, or provide the mobile device 206 with the geographic information at specified time periods (e.g., every four hours) or when, for example, the server application 246 is able to communicate with the mobile device 206 via the network 210 or any other network. The geographic information may be provided in any format, such as an image, nodes and segments, data for assembling the map, or other organization. The image may be a digital image (e.g., a digital map) or a raster or pixel based image (e.g., JPEG, Bitmap, Pixmap, Tiff, etc.). In one embodiment, the geographic information is not a raster or pixelated image (e.g., map), but is instead a vector-based digital graphical image or model of the geographic data (e.g., in a scalable vector graphics ("SVG") format, portable document format ("PDF"), post script ("PS") format, other vector graphics format, and/or other graphical model format.

In turn, the processor 300 of the mobile device 206 is generally operable to display, present, or provide, on the display 306, the geographic information obtained or received from the navigation application 246. The processor 300 may, for example, display the map 248, one or more other maps of the geographic data, route guidance, route calculation, and/or other navigation-related information on the display 306 for the benefit of the end user 208.

The processor 300 is further operable to adjust or change the geographic information (e.g., one or more maps, route guidance, etc.) displayed or provided on the display 306 of the mobile device 206. The change is based on or as a function of the data indicative of the measured or determined rotational information of the mobile device 206 and/or the data indicative of the measured or determined movement (e.g., direction, magnitude, absolute angle, or other characteristic) of the end user 208. In other words, the processor 300 is operable to adjust or change the geographic information displayed or provided on the display 306 of the mobile device 206 based on or as a function of the movement (e.g., rotational and/or translational movement) detected by the one or more sensors, such as, for example, the accelerometer 314 and/or the camera 322.

In one embodiment, this may involve moving, changing, or switching between a first type, output, display, or screen 350 of the geographic information and a second type, output, display, or screen 352 of the geographic information. The second output 352 may be entirely or only partially different than the first output 350 (in the latter case, some of the geographic information may be included in both the first and the second outputs 350, 352). The first output 350 may be the map 248, one or more other maps of the geographic data (e.g., the layers 222 and/or 224), route guidance, and/or other navigation-related information associated with the geographic data. In one embodiment, the second output 352 is different than the first output 350 and may be the map 248 (when, for example, the first output 350 is not the map 248), the map 248 with additional geographic data, one or more other maps of the geographic data, route guidance, and/or other navigation-related information associated with the geographic data. In other embodiments, the first output 350 and/or the second output 352 may include different layers and/or different combinations of the layers.

In another embodiment, the processor 300 may, when movement is detected by the one or more sensors, blend or combine the displayed, outputted, or presented first output 350 with other geographic information (e.g., maps, route guidance, other navigational information) to form or create the second output 352. The processor 300 may, for example, blend or combine the map of the second layer 222 with the map of the third layer 224 to form or create the second output 352. The processor 300 may blend or combine the map 248, one or more other maps of the geographic data, route guidance, other navigation-related information, or combinations thereof. The operator 204 may determine which of the geographic information is blended or combined by the processor 300. Alternatively, this may be determined by the end user 208. For example, the end user 208 may instruct the processor 300 to blend the map 248 with the map of the second layer 222 and output or provide the blended map as the second output 352.

Figure 5A:
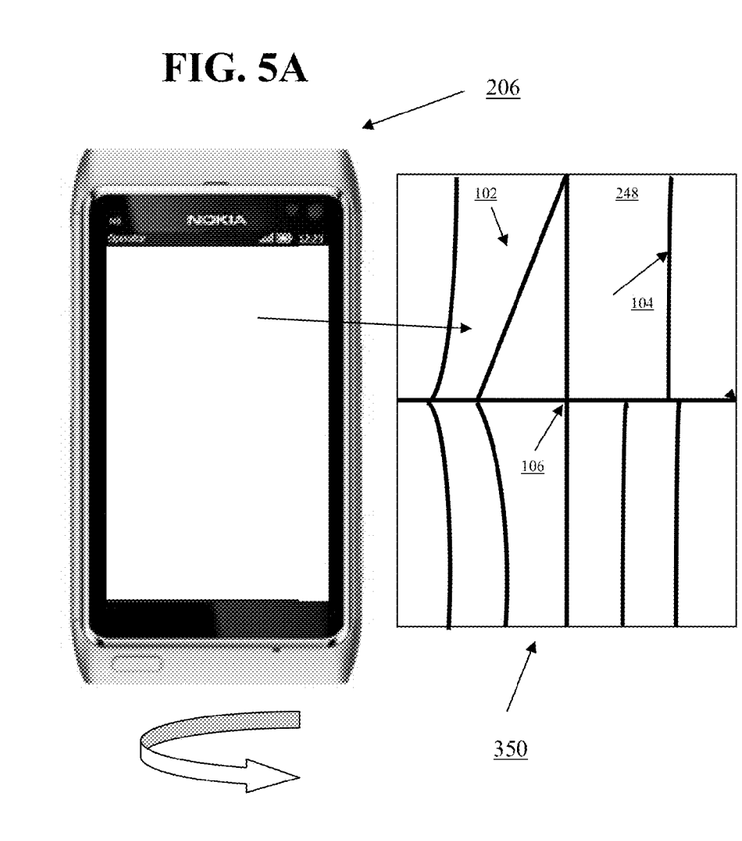
FIG. 5A depicts the mobile device of FIG. 4 displaying a first output of geographic data.
Figure 5B:
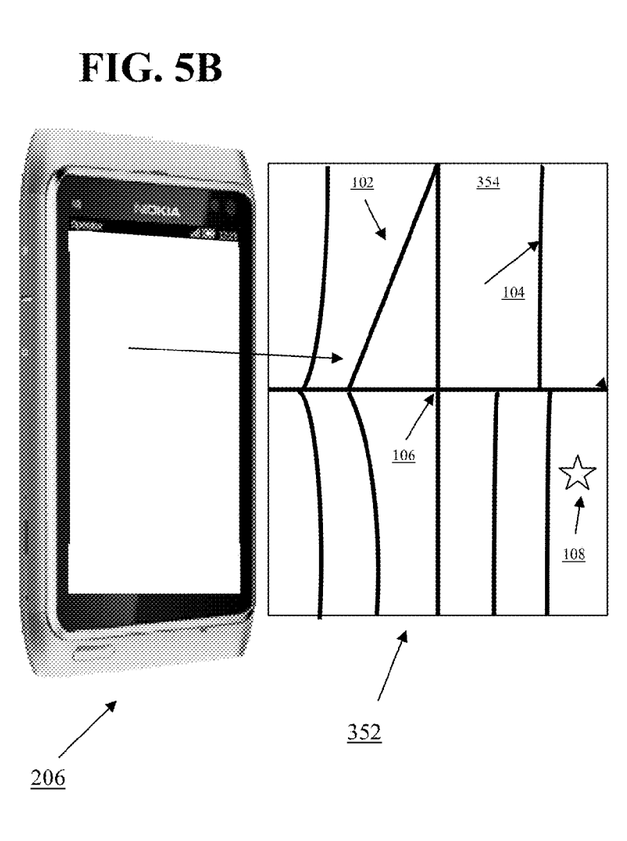
FIG. 5B depicts the mobile device of FIG. 4 displaying a second output of geographic data after movement of the mobile device has been detected.

FIGS. 5A and 5B illustrate an exemplary embodiment in which the mobile device 206 has obtained or received the map 248 and the map of the second layer 224 from the navigation-related server application 246. In FIG. 5A, the first output 350 is the map 248 of the base layer 220, which depicts or illustrates the link data records 217 and node data records 218 in the geographic region 100, and the mobile device 206 has not been rotated and/or titled about the vertical axis 316 or the horizontal axis 318. When the mobile device 206 is, for example, rotated about the vertical axis 316 by the end user 208 (see the arrow in FIG. 5A) to the position or orientation shown in FIG. 5B, the accelerometer 314 detects this rotation, determines or detects the magnitude of this rotation, and transmits the data indicative of the measured or determined rotational magnitude of the mobile device 206 to the processor 300. The processor 300, after processing the data indicative of the measured or determined rotational magnitude, changes or switches the output of the display 306 from the first output 350 (i.e., the map 248) to the second output 352. In this embodiment, the second output 352 is a blended map 354. The blended map 354 represents the map 248 of the base layer 220 blended (by the processor 300 or the navigation server 214) with the map of the second layer 222, which depicts or illustrates the POI data records 219 in the geographic region 100. Accordingly, the end user 208 is able to view the roads 104 and the intersections 106 when the mobile device 206 is positioned or oriented as shown in FIG. 5A, but is able to view the roads 104 and the intersections 106, along with the points of interest 108, when the mobile device 206 is positioned as shown in FIG. 5B.

In other embodiments, the processor 300 is operable to move, change, or switch between the first output 350 or the second output 352 and additional or different geographic information based on further or other movements (movement in different directions, along different axes, and/or different magnitude). The additional or different geographic information may include further outputs or displays (e.g. a third output, a fourth output, etc.) of geographic information. The third output, the fourth output, and further outputs may be the map 248, the map 248 with additional geographic data, one or more other maps of the geographic data, route guidance, and/or other navigation-related information associated with the geographic data. The third output, the fourth output, and other outputs may be entirely or only partially different than the first output 350 and/or the second output 352.

The further or other movements (movement in different directions, along different axes, and/or different magnitude) may include rotation of the mobile device 206 in an opposite direction (from the direction shown in FIGS. 5A and 5B), about a different axis (e.g., the horizontal axis 318), in the same direction but at a greater or smaller magnitude. Rotation of the mobile device 206 in an opposite direction may, for example, blend the base layer 220 with the third layer 224. Rotation of the mobile device 206 about a different axis (e.g., the horizontal axis 318) may, for example, blend the geographic information from the three layers 220, 222, 224. Rotation or movement back to the original orientation or starting position of the mobile device 206 may or may not alter the display of information. For example, once triggered, the map displayed on the mobile device 206 may remain the same even when the mobile device 206 is rotated back so that the display 306 again faces the user. The map may be transitioned back to the base layer only map (e.g., the map 248) by rotating the mobile device 206 "away" from the user 208 (i.e., so that it does not face the user) in an opposite or same direction. The further or other movements may alternatively or additionally include movement of the end user 208, such as, for example, side-to-side movement of the user's head. Side-to-side movement of the user's head may, for example, trigger or cause navigational information (e.g., route guidance) to be displayed on the mobile device.

Any combination of movement (rotational and/or translational movement) may be used to control the geographic information displayed. The geographic information is displayed at a same orientation, but different geographic information (e.g., completely different or a different combination of geographic information) is displayed due to the movement. The geographic information displayed is different due to any movement of the mobile device 206 and/or the user 208. In some embodiments, the type of geographic information, such as the map 248, one or other maps of the geographic data, route guidance, route calculation, and/or other navigational information, displayed may be different due to movement control of the mobile device 206 and/or the user 208.

Unlike known mobile devices or platforms, which require end users who are viewing one screen or display of geographic information and wish to view or see different or additional geographic information to view that information in a different or separate screen or display and/or actively import (press buttons and/or select menu items) that information via their mobile or portable device, the system 200 allows the end user 208 to view additional geographic information and/or switch between different screens or displays of geographic information by moving the mobile device 206 and/or his/her arm(s), hand(s), head, and/or other body part(s), as described herein.

Figure 6:
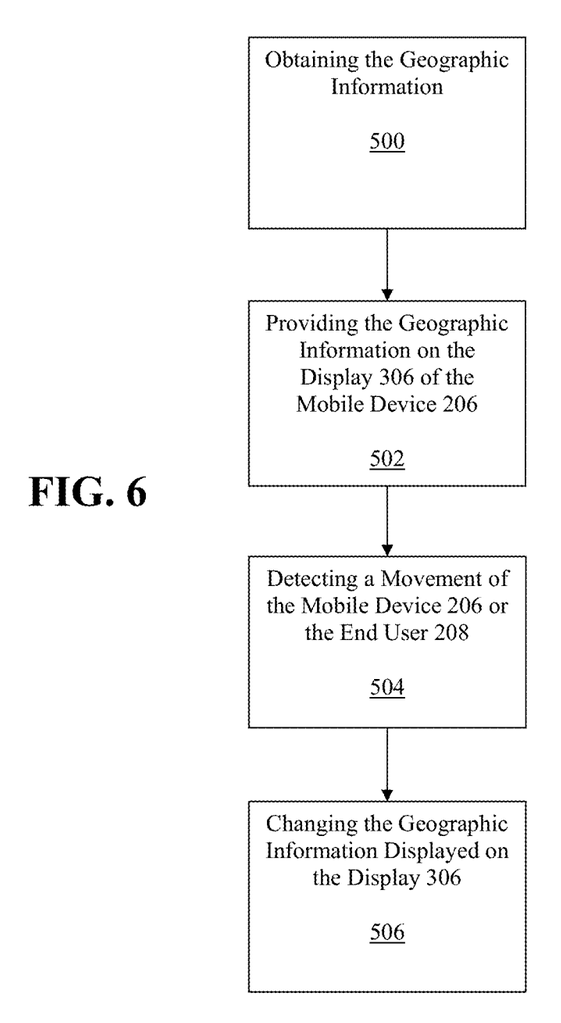
FIG. 6 depicts a flow chart showing one embodiment of a method for changing geographic information displayed on a mobile device.

Referring to FIG. 6, there is shown a flow chart depicting the operation of the system 200 for changing geographic information displayed on a mobile device according to one embodiment. The operation is implemented by a mobile device, by a mapping or navigation server, or by combinations thereof. In one embodiment, the system of FIG. 2 is used. In other embodiments, a different system may be used. The method is implemented in the order shown, but may be implemented in or according to any number of different orders. Additional, different, or fewer acts may be provided. For example, the act of obtaining data (act 500) may be repeated in response to the act of detecting movement (act 504).

The operation or method includes obtaining the geographic information associated with the geographic region (act 500). The mobile device may obtain the geographic information from a remote navigation server, a navigation server application, a local memory, or other source. The source generates the geographic information (e.g., one or more maps, route guidance, route calculation, and/or other navigational information) by accessing the geographic data stored or maintained in a navigation database. The geographical information may be obtained as an image (e.g., a map) or as data used to assemble or create an image.

The geographic information to be displayed at a given time is obtained. Additional information, even if not to be displayed at the time, may be obtained. For example, information for a base layer is obtained with or without other layers where only the base layer is to be displayed. The information for the other layers is obtained as needed or originally obtained and used as needed. In some cases, the information for the other layers is originally obtained but not used or displayed.

The operation or method also includes providing, outputting, or displaying, on the display of the mobile device, the obtained geographic information (act 502). The method may, for example, include displaying, on the display of the mobile device, a first output of the geographic information. The first output may be one or more maps depicting road segment data records, node data records, point of interest data records, topographical data records, other data records, other geographic data, or combinations thereof. The first output may, alternatively or in addition, include route guidance, route calculation, and/or other navigation-related information.

The operation or method further includes detecting a movement of the mobile device or an end user associated with the mobile device (act 504). Detecting includes detecting a rotational and/or translational movement of the mobile device about, for example, a vertical axis, a horizontal axis, and/or any other axis of the mobile device using one or more sensors. The rotational and/or translational movement detected is different than movement due to or caused by simply traveling along a road network, pedestrian network, bike network, transit network, other network, and/or a path or route of the end user. Alternatively or additionally, detecting includes detecting rotational, translational, and/or scaling of a body part, such as a head, an arm, a shoulder, a finger, etc., of the end user using the one or more sensors. The one or more sensors may include, for example, an accelerometer and/or a camera. When movement is detected, data indicative of the detected motion is generated. The data is indicative of the measured or determined movement of the mobile device or the end user.

The operation or method further includes changing or altering the geographic related information output or displayed on the display based on or as a function of the movement detected by the one or more sensors (act 506). The method may, for example, include changing or switching the display of the mobile device between the first output and the second output based on or as a function of the detected movement. The second output is different than the first output. The first and second outputs may differ in type of content. For example, the first output may include one or more maps, while the second output may include route guidance. Alternatively, or in addition thereto, the first and second outputs may and/or may not include different geographic data or information and/or a different combination of the geographic data or information. The first output may be one or more maps of a road network, points of interest, topographical features, and/or other networks (bike, pedestrian, and/or transit networks), route information (e.g., route guidance), or combinations thereof. For example, movement of the mobile device (other than or different than movement associated with traveling along the route) may trigger or cause point of interest data to be displayed on the mobile device over or instead of originally displayed road segment data. As another example, rotation of the mobile device may trigger or cause route information to be displayed on the mobile device over or instead of previously displayed point of interest data. In another embodiment, the method further includes blending the first output of the geographic information with other geographic data or information to form the second output of the geographic information. Accordingly, the second output may be a blended map that represents the map of the base layer (which depicts or illustrates the segment data records and the node data records) blended with the map of the second layer (which depicts or illustrates the POI data records). In other embodiments, the second output may be a different blended map, such as, for example, one that represents the originally displayed map blended with one or more other maps of geographic data. In further embodiments, the second output may be a blended display of navigational information and/or a blended display of one or more maps with navigational information.

The geographic information for the second output or display and the geographic information for the first output or display may be obtained from a same or different source. The different geographic information are obtained remotely from the mobile device, but may be obtained from a local memory in the mobile device. In one embodiment, the geographic information for the second output or display is obtained remotely and stored locally before any movement is used to trigger or cause display of the geographic information for the second display. The obtained information may never be displayed. Alternatively, the geographic information for the second output or display may be obtained as needed.

Figure 7:
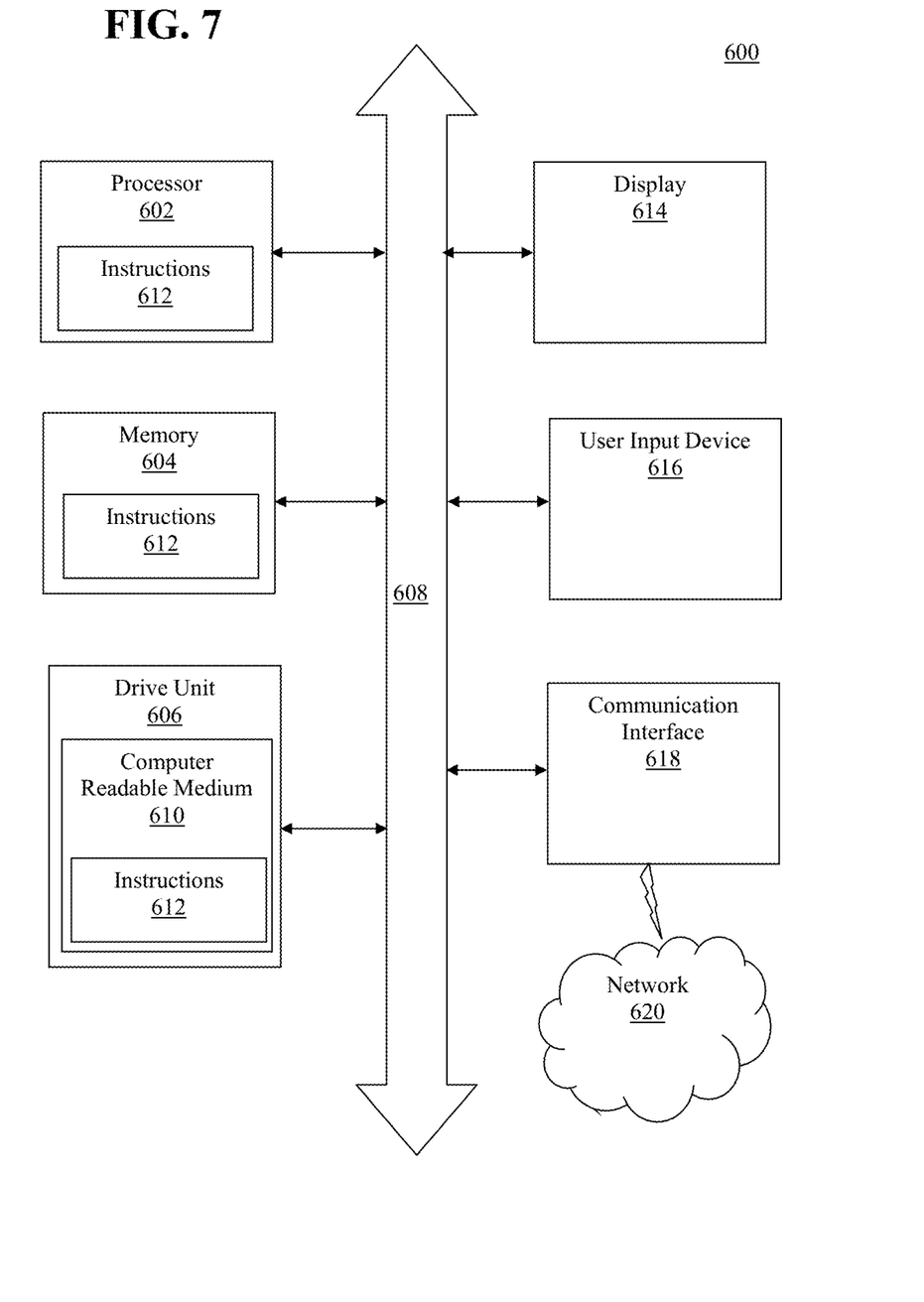
FIG. 7 depicts an exemplary computer system for use with the system of FIG. 2.

Referring to FIG. 7, an illustrative embodiment of a general computer system 600 is shown. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices. Any of the components discussed above may be a computer system 600 or a component in the computer system 600.

In a networked deployment, the computer system 600 may operate in the capacity of a server or as a client user computer in a client-server user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 7, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 604 includes a cache or random access memory for the processor 602. In alternative embodiments, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 600 may further include a display unit 614, such as a liquid crystal display (LCD), an organic light emitting diode (OLED), a flat panel display, a solid state display, a cathode ray tube (CRT), a projector, a printer or other now known or later developed display device for outputting determined information. The display 614 may act as an interface for the user to see the functioning of the processor 602, or specifically as an interface with the software stored in the memory 604 or in the drive unit 606.

Additionally, the computer system 600 may include an input device 616 configured to allow a user to interact with any of the components of system 600. The input device 616 may be a number pad, a keyboard, or a cursor control device, such as a mouse, or a joystick, touch screen display, remote control or any other device operative to interact with the system 600.

In a particular embodiment, as depicted in FIG. 7, the computer system 600 may also include a disk or optical drive unit 606. The disk drive unit 606 may include a computer-readable medium 610 in which one or more sets of instructions 612, e.g. software, can be embedded. Further, the instructions 612 may embody one or more of the methods or logic as described herein. In a particular embodiment, the instructions 612 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 612 or receives and executes instructions 612 responsive to a propagated signal, so that a device connected to a network 620 can communicate voice, video, audio, images or any other data over the network 620. Further, the instructions 612 may be transmitted or received over the network 620 via a communication port 918. The communication port 618 may be a part of the processor 602 or may be a separate component. The communication port 618 may be created in software or may be a physical connection in hardware. The communication port 618 is configured to connect with a network 620, external media, the display 614, or any other components in system 600, or combinations thereof. The connection with the network 620 may be a physical connection, such as a wired Ethernet connection or may be established wirelessly as discussed below. Likewise, the additional connections with other components of the system 600 may be physical connections or may be established wirelessly.

The network 620 may include wired networks, wireless networks, or combinations thereof, and may be representative of the network 210. The wireless network may be a cellular telephone network, an 802.11, 802.16, 802.20, or WiMax network. Further, the network 620 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
obtaining first, second, and third geographic information associated with a geographic region, wherein the first geographic information includes road link data, the second geographic information includes point-of-interest data, and the third geographic information includes topographic data;
providing, by a processor, the first geographic information including road link data on a display of a mobile device at an orientation relative to a view of the display;
detecting a first movement of the mobile device the first movement being other than a change in a geographic location of the mobile device, the first movement having a first magnitude;
changing, by the processor, the display of the mobile device to display the second geographic information including the point-of-interest data in response to the first movement of the mobile device, wherein the second geographic information is displayed at the same orientation relative to the same view of the display as the first geographic information, and the second geographic information includes the same geographic region as the first geographic information;
detecting a second movement of the mobile device the first movement being other than a change in a geographic location of the mobile device, the second movement having a second magnitude different than the first magnitude; and
changing, by the processor, the display of the mobile device to display the third geographic information including the topographic data in response to the second movement of the mobile device.

2. The method of claim 1, wherein the first geographic information further comprises a first map of the geographic region and the second geographic information comprises a second map of the geographic region, the second map being different than the first.

3. The method of claim 1, wherein the first geographic information comprises a first map of a base layer of geographic data in the geographic region.

4. The method of claim 3, wherein the first map of the base layer comprises data indicative of a road network in the geographic region.

5. The method of claim 3, wherein the second geographic information comprises a second map of the geographic region, the second map being a map of the base layer of the geographic data in the geographic region combined with a second layer of the geographic data in the geographic region.

6. The method of claim 3, wherein the second geographic information comprises a second map of a second layer of the geographic data in the geographic region.

7. The method of claim 6, wherein the second map of the second layer comprises data indicative of one or more points of interest (POI) in the geographic region.

8. The method of claim 3, wherein the second geographic information comprises a second map of the geographic region, the second map being a map of the base layer of the geographic data in the geographic region blended with two or more maps of two or more respective additional layers of the geographic data in the geographic region.

9. The method of claim 1, wherein detecting comprises detecting a rotational movement of the mobile device using an accelerometer in the mobile device.

10. The method of claim 9, wherein detecting comprises detecting the rotational movement of the mobile device about a vertical axis of the mobile device.

11. A mobile device comprising:
a processor operable to obtain geographic data associated with a geographic region;
a display operable to display a first image comprising a map of a base layer of the geographic data in the geographic region at an orientation based on the geographic data; and
a sensor operable to detect a movement of the mobile device and a magnitude of the movement of the mobile device,
wherein the processor is further operable to:
change the first image displayed on the display to a second image associated with a first detected movement having a first magnitude, the second image comprising a second layer of the geographic data in the geographic region combined with the base layer, wherein the second layer contains geographic data not displayed in the first image, and
change the second image displayed on the display to a third image associated with a second detected movement having a second magnitude different than the first magnitude, the third image comprising a third layer of the geographic data in the geographic region combined with the base layer, wherein the third layer contains geographic data not displayed in the first image or the second image.

12. The mobile device of claim 11, wherein the sensor comprises an accelerometer and the movement is a rotational movement of the mobile device.

13. The mobile device of claim 11, wherein the second image comprises a second map of the second layer of the geographic data in the geographic region.

14. The mobile device of claim 11, wherein the second layer of the geographic data comprises data relating to a point of interest (POI) not available in the base layer.

15. The mobile device of claim 11, wherein the base layer includes data relating to road links and the second layer includes data relating to a point of interest (POI).

16. A system comprising:
   a server in communication with a mobile device and operable to obtain geographic data representing a geographic region from a geographic database;
   wherein the server is operable to receive, from the mobile device, data indicative of a magnitude of a movement of the mobile device; and
   wherein the server is further operable to:
      enable the mobile device to:
         switch from a first layer of the geographic data to a second layer of the geographic data associated with a first magnitude of the movement when the movement having the first magnitude is detected, the second layer including a different type of data than the first layer, and
         switch from the first layer of the geographic data to a third layer of the geographic data associated with a second magnitude of the movement when the second magnitude of the movement is detected, the third layer including a different type of data than the first layer or the second layer.

17. The system of claim 16, wherein the first layer is a map and the second layer is route guidance.

* * * * *